(12) United States Patent
Shinozaki

(10) Patent No.: US 7,486,946 B2
(45) Date of Patent: Feb. 3, 2009

(54) ELECTRONIC APPARATUS AND WIRELESS COMMUNICATION CONTROL METHOD

(75) Inventor: Hiroshi Shinozaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 387 days.

(21) Appl. No.: 11/271,950

(22) Filed: Nov. 14, 2005

(65) Prior Publication Data

US 2006/0141986 A1   Jun. 29, 2006

(30) Foreign Application Priority Data

Dec. 27, 2004   (JP)   ............... 2004-378185

(51) Int. Cl.
*H04M 3/16* (2006.01)
(52) U.S. Cl. ...................... 455/410; 455/411
(58) Field of Classification Search ................. 455/410, 455/411, 418, 419; 710/48; 726/16; 353/30, 353/31, 121, 42, 22; 348/14.02, 14.05, 211.2–211.7; 725/109, 123, 126, 133
See application file for complete search history.

(56) References Cited

U.S. PATENT DOCUMENTS

| | | | |
|---|---|---|---|
| 6,360,091 B1 * | 3/2002 | Schellinger et al. | ......... 455/403 |
| 6,793,352 B2 | 9/2004 | Karasawa et al. | |
| 2003/0051139 A1 | 3/2003 | Kubota | |
| 2003/0125083 A1 * | 7/2003 | Iwasaki | ...................... 455/558 |
| 2004/0267981 A1 * | 12/2004 | Kakemura | ................... 710/48 |

FOREIGN PATENT DOCUMENTS

| | | |
|---|---|---|
| JP | 2002-247539 | 8/2002 |
| JP | 2002-252880 | 9/2002 |
| JP | 2002-258398 | 9/2002 |
| JP | 2003-069923 | 3/2003 |
| JP | 2003-198870 | 7/2003 |
| JP | 2003-215707 | 7/2003 |

* cited by examiner

*Primary Examiner*—Sam Bhattacharya
(74) *Attorney, Agent, or Firm*—Pillsbury Winthrop Shaw Pittman, LLP

(57) ABSTRACT

When a user wants to transfer display data of a personal computer to project it by a projector, the user firstly mounts a medium on the projector to depress a dedicated button of a remote controller. Then, since a variety of items of information including random numbers generated from the projector are stored on the medium, the user re-mounts the medium on the personal computer. In this state, when the user initiates a dedicated utility, environment setting for wireless communication based on the variety of items of information stored on the medium is performed and a connection request with the random numbers added thereto is transmitted to the projector. The projector received this connection request replies a permission notification on condition of coincidence in random numbers and the personal computer received this notification automatically starts to transfer the display data.

3 Claims, 7 Drawing Sheets

ELECTRONIC APPARATUS AND WIRELESS COMMUNICATION CONTROL METHOD

CROSS-REFERENCE TO RELATED APPLICATIONS

This application is based upon and claims the benefit of priority from prior Japanese Patent Application No. 2004-378185, filed Dec. 27, 2004, the entire contents of which are incorporated herein by reference.

BACKGROUND OF THE INVENTION

1. Field of the Invention

The present invention relates to a wireless communication control technique suitably applied to, for example, a wireless projector and a personal computer (PC) for transferring display data to this wireless projector and the like.

2. Description of the Related Art

A projector has been widely used as a apparatus to present a variety of materials to participants in the case of a conference or a presentation. This projector receives the display data from the PC or the like connected with a cable though a connector to project it onto a screen.

In recent years, various sorts of projectors for improving usability have been proposed, wherein the projectors eliminate troublesome work such as reconnection of connectors by adding, for example, network functions when PCs for outputting the display data are replaced (for example, cf., Jpn. Pat. Appln. KOKAI Publication No. 2003-69923, Jpn. Pat. Appln. KOKAI Publication No. 2002-247539, and Jpn. Pat. Appln. KOKAI Publication No. 2003-198870).

Incidentally, an electronic apparatus with a wireless communication function capable of transmitting and receiving data without wires has been widely used lately. For example, as far as a so-called wireless projector with an interface for connecting it to a wireless LAN can receive the display data from PCs brought by each person, through wireless communication to project it.

However, it is hard for a user not familiar with the wireless LAN to conduct environment setting of wireless communication, for example, a service set identification (SSID), a wired equivalent privacy (WEP) key and the like. It is very important for the wireless LAN to take security measures for restrict the wireless communication to other than an authorized party.

BRIEF SUMMARY OF THE INVENTION

According to an embodiment of the present invention, an electronic apparatus comprises a wireless communication unit; a slot capable of mounting a medium detachably; a store processing unit configured to store predetermined information which restricts wireless communication of the wireless communication unit to be made only to and from an authorized opposite party into a recording medium mounted on the slot; a determining unit configured to determine whether or not an opposite party transmitted a connection request to establish a wireless communication path is an authorized one, on the basis of the predetermined information stored in the recording medium by the store processing unit when the connection request is received by the wireless communication unit; and a control unit configured to permit the connection request when the determining unit determines that the opposite party is the authorized one, and to reject the connection request otherwise.

According to another embodiment of the present invention, an electronic apparatus comprises a slot capable of mounting a recording medium detachably; a reading processing unit configured to read predetermined information to make wireless communication to and from an authorized opposite party from the recording medium mounted on the slot; a transmitting unit configured to transmit a connection request to establish a wireless communication path via the wireless communication unit to the authorized opposite party by using the predetermined information read out by the reading processing unit; and a control unit configured to automatically start data transfer via the wireless communication unit when the connection request transmitted by the transmitting unit is permitted.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
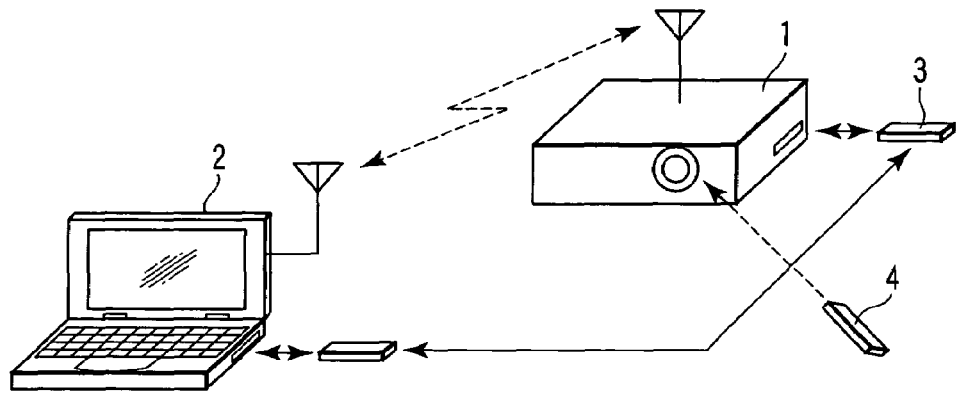
FIG. 1 is a view for explaining a schema of wireless communication control performed by a wireless communication system regarding an embodiment of the present invention.

Hereinafter, an embodiment of the present invention will be described with reference to drawings. FIG. 1 is the view for explaining the schema of the wireless communication control performed by the wireless communication system regarding the embodiment of the present invention.

As shown in FIG. 1, this communication system executes wireless communication by a projector 1 for receiving display data to project it onto a screen and a PC 2 for transmitting the display data to the projector 1. The projector 1 and the PC 2 can detach media 3 which are nonvolatile storage media, respectively. The projector 1 is provided with a remote controller 4 for performing a remote operation, as an attached device.

At this point, for example, the projector 1 is installed in a conference room. A situation is assumed, wherein a person intending to promote a conference in this room by using the projector 1 brings their own PC 2 in the room. This communication system can easily start data transfer from the PC 2 brought by a person to the projector 1 installed in the room even if the person is not familiar with environment setting of wireless communication. This point will be described in detail below.

When a user wants to project the display data (image data displayed on a display device) of the PC 2 brought by the user by mans of the projector 1, the user firstly mounts the medium 3 on the projector 1 and depresses a dedicated button of the controller 4. When this operation is conducted, the projector 1 generates random numbers to store them onto the medium 3 together with a media access control (MAC) address, an SSID, a WEP key and the like.

This embodiment, as to an example, uses the generated random numbers as device unique IDs for identifying devices. However, it is not necessary for the present invention to use the random numbers as the unique ID, and the present invention may use anything possible to be used as unique IDs for identifying devices.

At this point, the depressing of the dedicated button is taken into consideration as an example, any operation manner, for example, a manner to simultaneously depress a plurality of buttons to which original functions are separately assigned, respectively, can be used.

Next to this, the user ejects the medium 3 with a variety of items of information including the random numbers stored thereon from the projector 1 to mount the medium 3 on a side of the PC 2 owned by the user and activates a dedicated utility program. After activation, this program reads out the variety of items of information stored a the side of the projector 1 from the medium 3. and conducts the environment setting so as to make the wireless communication with the projector 1 by using the read out SSID and the WEP key. After completion of the environment setting, the utility program transmits a connection request for establishing a mutual linkage (wireless communication path) to the projector 1 indicated by the MAC address read out from the medium 3. At this time, the utility program adds the random numbers read out from the identical medium 3 to the corresponding connection request.

On the other hand, the projector 1 which has received this request checks whether or not the random numbers previously generated and stored on the medium 3 by itself are added thereto. And if the added random numbers coincide with the random numbers generated by the projector 1 itself, the projector 1 accepts the request to reply a permission notification to the PC 2. Then, in the PC 2 which has received this notification, the program automatically starts wireless transfer of the display data to the projector 1 and the projector 1 automatically starts projection of the display data wirelessly transferred in this manner.

That is, in this wireless communication system, after housing the medium 3 in the projector 1 and depressing the dedicated button of the remote controller 4, the user not familiar with the environment setting of the wireless communication can wirelessly transfer and project the display data of the PC 2 to the projector 1 only by re-housing this medium 3 in the PC 2 and initiating the dedicated utility program.

With conducting of the wireless communication control in such a procedure, so-called exclusive control, for example, prevention of an interruption and projection of the display data from another PC 2 can be. appropriately achieved.

Figure 2:
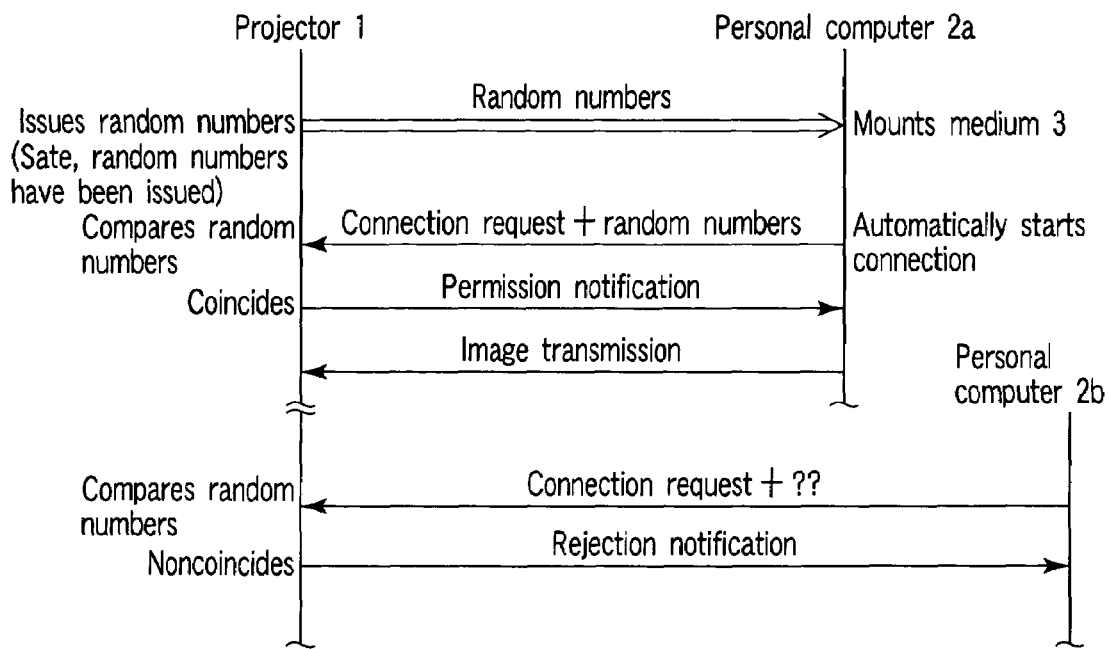
FIG. 2 is a view for explaining exclusive control achieved by the communication system regarding the embodiment.

For example, it is assumed that, as shown in FIG. 2, a transmission and a reception of the display data is started in accordance with the foregoing procedure between the projector 1 and the PC 2a. And it is assumed that, during the transmission and the reception, a PC. 2b which does not follow the above-described procedure, or which has ever transmitted and received the display data to and from the projector 1 by following the above-described procedure transmits a connection request to the projector 1.

In this case, since the connection request transmitted from the PC 2b is not added the random numbers or added the random numbers different from the latest random numbers, the communication system can reply a rejection notification for this connection request to the PC 2b.

Figure 3:
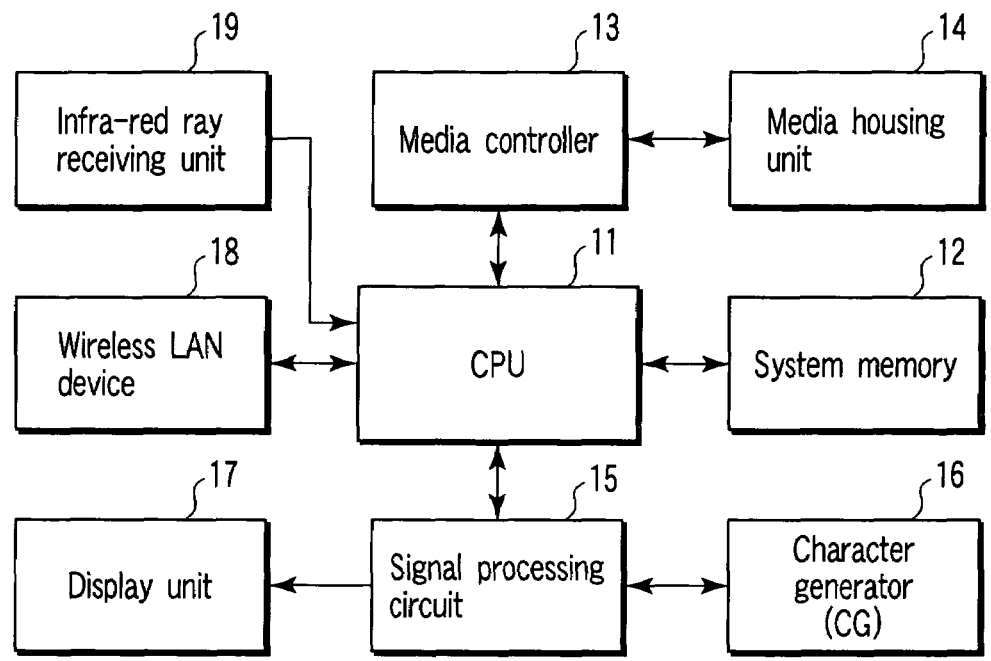
FIG. 3 is a view showing a hardware configuration of a projector composing the communication system regarding the embodiment.
Figure 4:
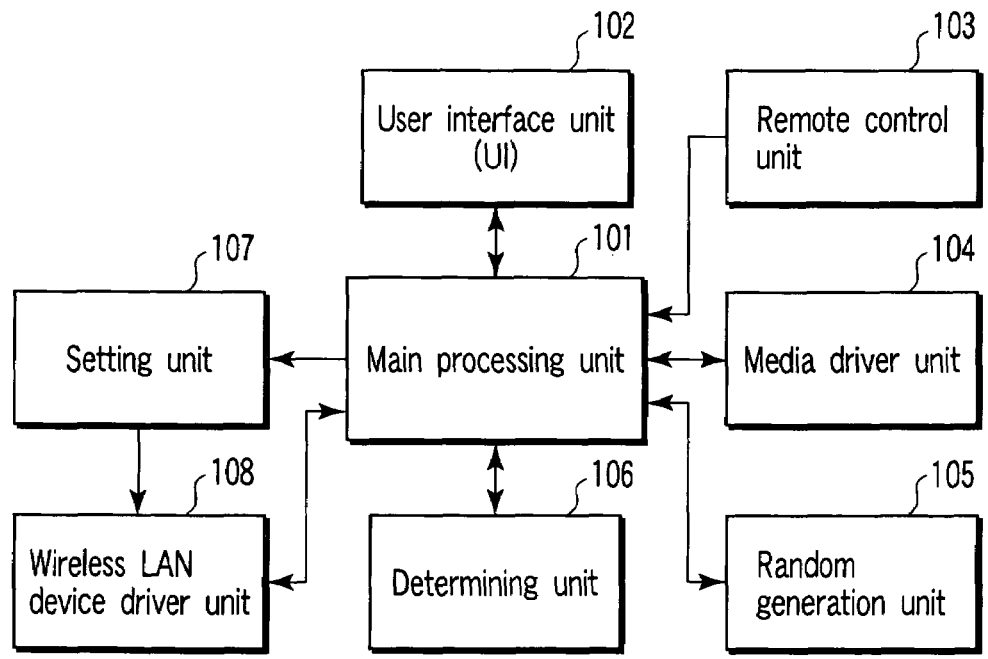
FIG. 4 is a view showing a software configuration of the projector composing the communication system regarding the embodiment.

FIG. 3 shows the hardware configuration of the projector 1 and FIG. 4 shows the software configuration of the projector 1.

As shown in FIG. 3, the projector 1 has a CPU 11, a system memory 12, a media controller 13, a media housing unit 14, a signal processing circuit 15, a character generator 16, a display unit 17, a wireless LAN device 18 and an infra-red receiving unit 19.

The CPU 11 executes a program which controls the whole of the projector 1 and stored on a system memory 12. The memory 12 is a storage medium for storing a program to be executed by the CPU 11. The media controller 13 controls accesses to the medium 3 housed in the media housing unit 14. The media housing unit 14 is a slot capable of mounting the medium 3 detachably.

The signal processing circuit 15 is a computing circuit for conducting processing of a reproduction of image data and superposition of characters onto the reproduced image. The character generator 16 develops the text codes transferred from the processing circuit 15 to data possible to be displayed and returns it. The display unit 17 projects the display data transferred from the processing circuit 15 onto a screen. The wireless LAN device 18 controls the wireless communication with another wireless communication device of the PC 2 or the like. The infra-red receiving unit 19 receives a control signal from the remote controller 4.

On the other hand, as shown in FIG. 4, the projector 1 has a main processing unit 101, a user interface unit 102, a remote control unit 103, a media driver unit 104, a random number generation unit 105, a determining unit 106, a setting unit 107 and a wireless LAN device driver 108 as a function unit structured by making the CPU 11 execute the program stored on the memory 12.

Each unit operates under the control by the main processing unit 101, and the interface unit 102 presents, for example, a menu screen, etc., other than the display data from the PC 2, to the user via the display unit 17. The remote control unit 103 acquires, for example, instruction operations conducted on the remote controller 4 by the user in response to this menu screen, from the receiving unit 19. The media driver unit 104 is provided for drive-controlling the media controller 13 that is hardware, by software.

The random number generation unit 105 generates arbitrary numbers at random. When receiving the connection request, the determining unit 106 determines whether or not permits the request in accordance with the random numbers added to the request. The setting unit 107 performs the environment setting for the wireless communication by using the SSID and the WEP key acquired via the remote control unit 103, for example, for the setting screen presented by the user interface unit 102. The device driver 108 is provided for drive-controlling the wireless LAN that is hardware, by software.

Figure 5:
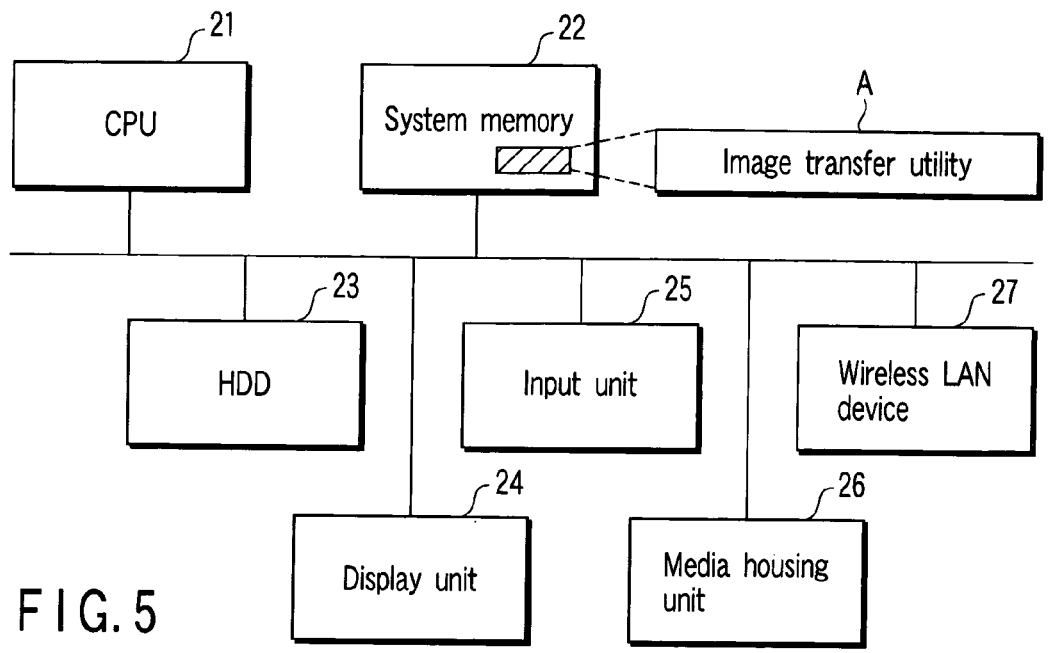
FIG. 5 is a view showing a hardware configuration (partially including software) of a PC composing the communication system regarding the embodiment.

FIG. 5 shows the hardware configuration of the PC 2 (partially including software configuration). As shown in FIG. 5, the PC 2 has a CPU 21, a system memory 22, a hard disk drive device (HDD) 23, a display unit 24, an input unit 25, a media housing unit 26 and a wireless LAN device 27.

The CPU 21 controls the whole of the PC 2 and executes the program stored on the memory 22. The memory 22 is a storage medium for temporary storing program and data, as a main storage device of the PC 2. On the other hand, the HDD 23 is a storage medium to be an external storage device for permanently storing the program and the data, as an auxiliary device of the memory 22. The foregoing dedicated utility program (image transfer utility A) is loaded onto the memory that is a main storage from the HDD 23 to become an external storage device and executed by the CPU 21.

The display unit 24 is, for example, a liquid crystal display (LCD) or the like and takes charge of an output side of the user interface provided by the PC 2. In contrast, the input unit 25 is, for example, a keyboard, a mouse or the like and takes charge of an input side of the interface provided by the PC 2. The media housing unit 26 is a slot capable of mounting the medium 3 detachably and the wireless LAN device 27 controls the wireless communication with another radio communication device like the projector 1 and the like.

Next to this, wireless communication control procedures of the wireless communication system of the embodiment composed of the projector 1 and the PC 2 having the configurations like this will be described with reference to flowcharts in FIGS. 6, 7 and 8.

Figure 6:
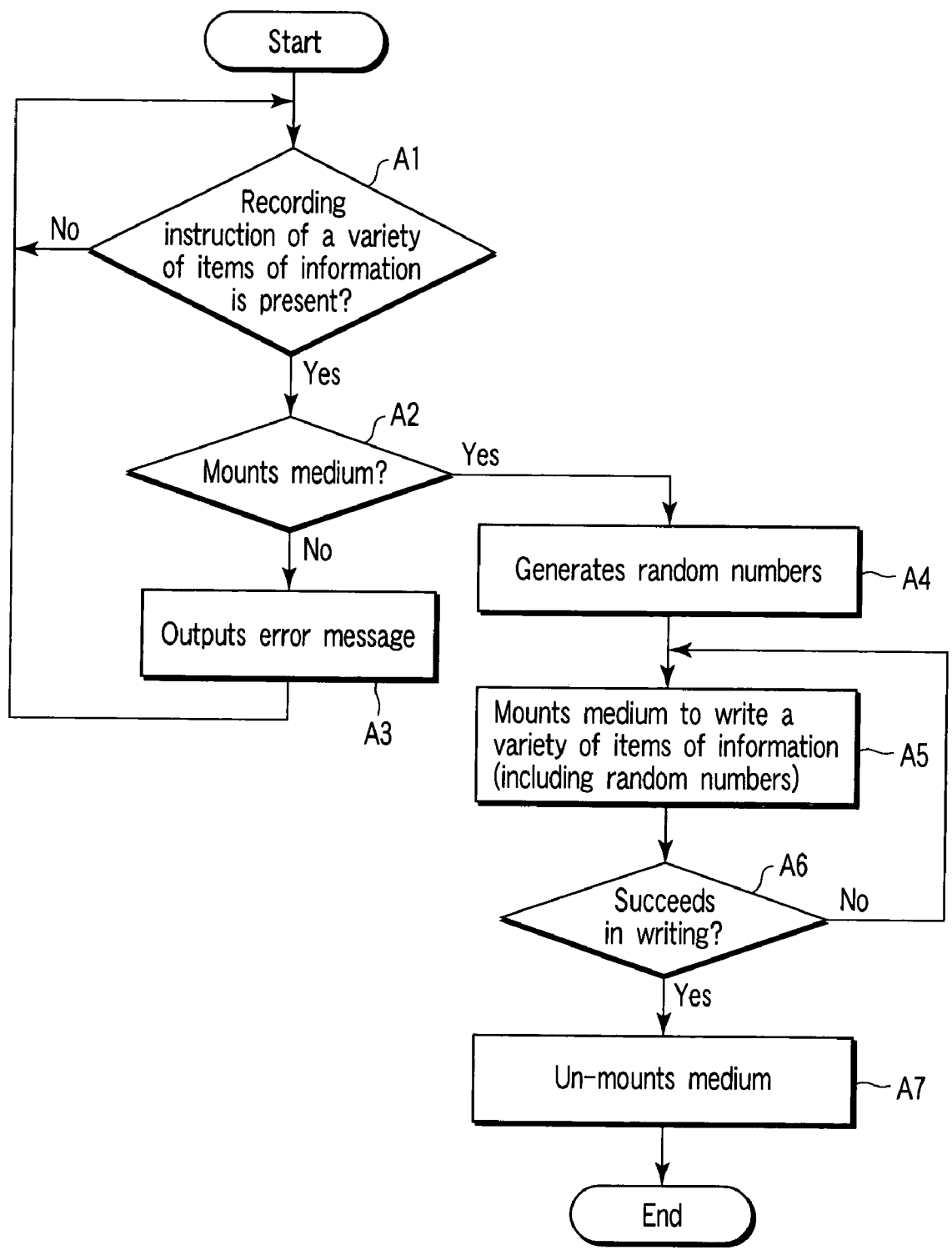
FIG. 6 is a flowchart showing an operation procedure when storing a variety of items of information including random numbers onto a medium in the projector composing the communication system regarding the embodiment.

FIG. 6 is the flowchart showing the operation procedure when storing the variety of items of information including the random numbers onto the medium 3 in the projector 1.

When being notified the fact that the dedicated button of the remote controller 4 is depressed from the remote control unit 103 (YES in step A1), the main processing unit 101 inquires the presence or absence of the medium 3 to the media driver unit 104 (step A2). If the medium 3 is not mounted (NO in step A2), the main processing unit 101 displays an error message to prompt to mount the medium 3 on the projector 1 onto the user interface unit 102 (step A3).

If the medium 3 is mounted (YES in step A2), the main processing unit 101 makes the random number generation unit 105 generate random numbers that are random values (step A4). Then, the main processing unit 101 instructs the mounting of the medium 3 and writing a variety of items of information including the generated random numbers into the medium 3 (step A5). If the writing completes successfully (YES in step A6), the main processing unit 101 instructs un-mounting of the medium 3 to the media driver unit 104 (step A7).

Figure 7:
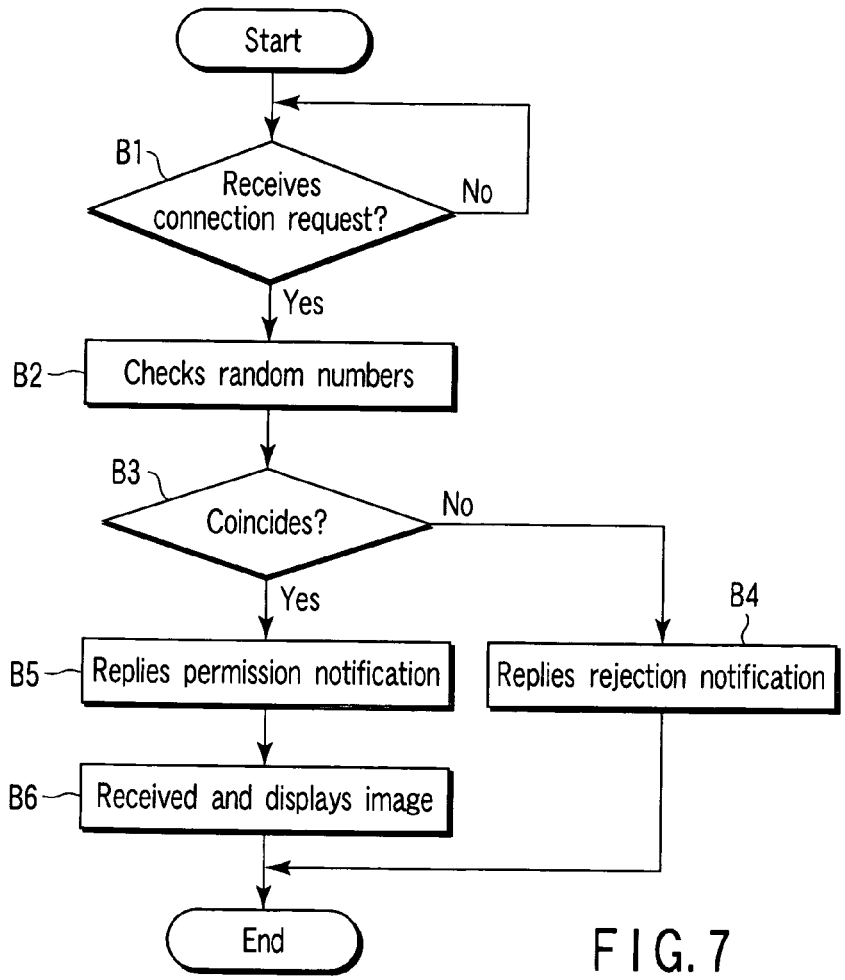
FIG. 7 is a flowchart showing an operation procedure when a connection request from the PC in the projector composing the communication system regarding the embodiment is received.

FIG. 7 is the flowchart showing the operation procedure when the projector 1 receives the connection request from the PC 2.

When being notified the fact that the reception of the connection request from the PC 2 (YES in step B1), the main processing unit 101 makes the determining unit 106 check whether or not the random numbers to be added to the connection request coincide with the random numbers generated by the random generation unit 105 (step B2). If the random numbers do not coincide with each other (NO in step B3), the main processing unit 101 instructs the reply of the rejection notification against the connection request to the LAN device driver unit 108 (step B4).

If the random numbers coincide with each other (YES in step B3), the main processing unit 101 instructs the reply of the permission notification to the connection request to the LAN device driver unit 108 and also instructs the display of the display data to the user interface unit 102 (step B6).

Figure 8:
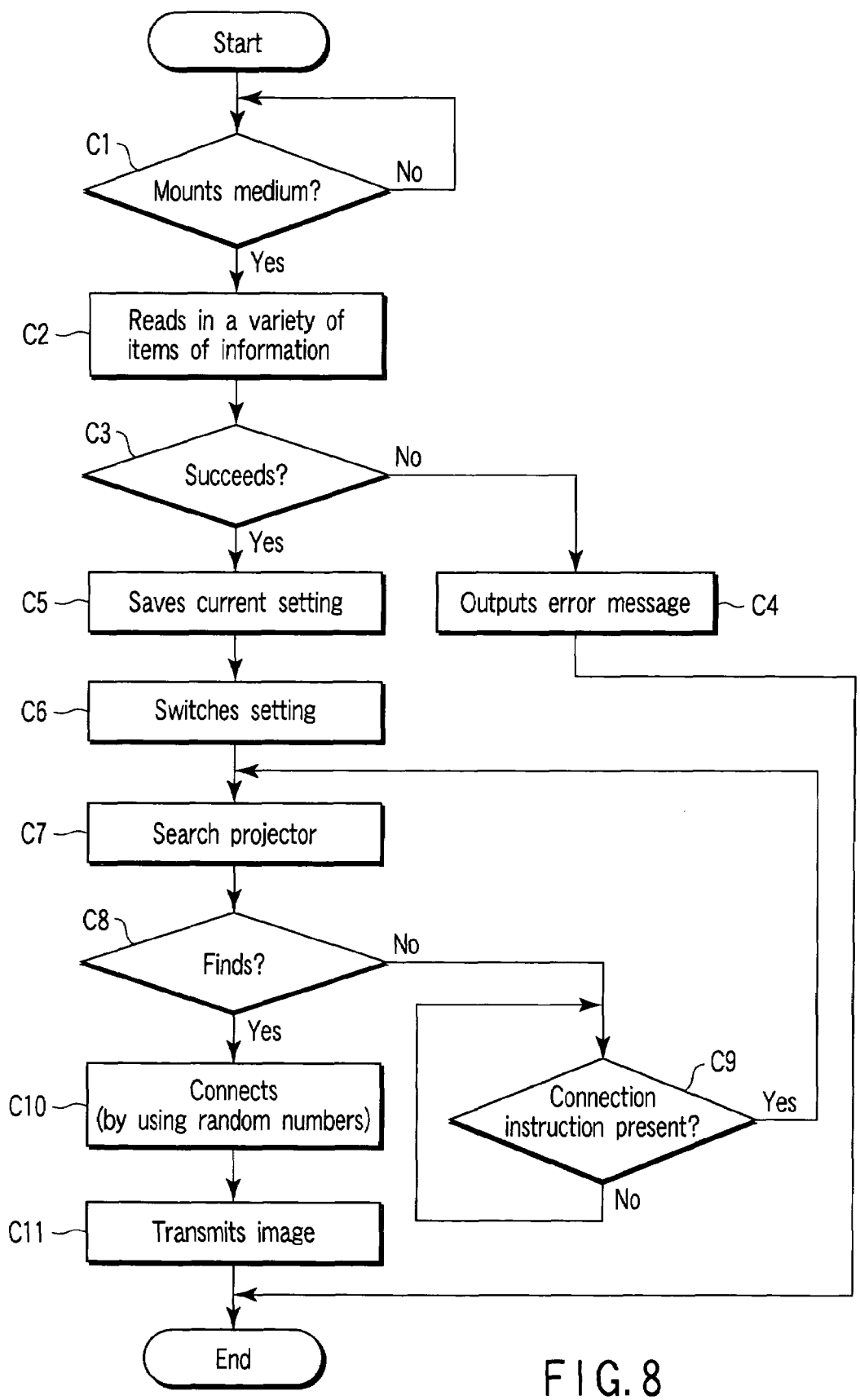
FIG. 8 is a flowchart showing an operation procedure when an image transfer utility A is initiated in the PC composing the communication system regarding the embodiment is received.

FIG. 8 is the flowchart showing the operation procedure when the image transfer utility A is initiated in the PC 2.

After being activated, the utility A firstly checks whether or not the medium 3 is mounted (step C1). If it is mounted (YES in step C1), the utility A reads the variety of items of information including the random numbers written on the side of the projector 1 (step C2). If this reading does not complete successfully (NO in step C3), the utility A outputs the error message to prompt a confirmation or the like of the medium 3 (step C4).

If this reading completes successfully (YES in step C), the utility A saves the current environment setting for executing the wireless communication via. the wireless LAN device 27 (step C5), and re-performs the environment setting for the wireless communication on the basis of the variety of items of information read from the medium 3 (step C6). Then, after this resetting, the utility A searches the projector 1 should exist circumferentially (step C8). If the projector 1 is not found (NO in step C9), the utility A waits for an explicit connection instruction from the user (step C9), when receiving the instruction (YES in step C9), the utility A searches again the projector 1.

If the projector 1 is found (YES in step C8), the utility A transmits the connection request to which the read random numbers added thereto to the projector 1 (step C10) to automatically start a transmission of the display data to the projector 1 after replying the permission notification (step C11).

As mentioned above, the wireless communication system of the embodiment easily starts the data transfer though the wireless communication with an authorized opposite party only by conducting an extremely simple operation such as transfer of the variety of kinds of information including the random numbers by interposing the medium 3 between the projector 1 and the PC 2.

Figure 9:
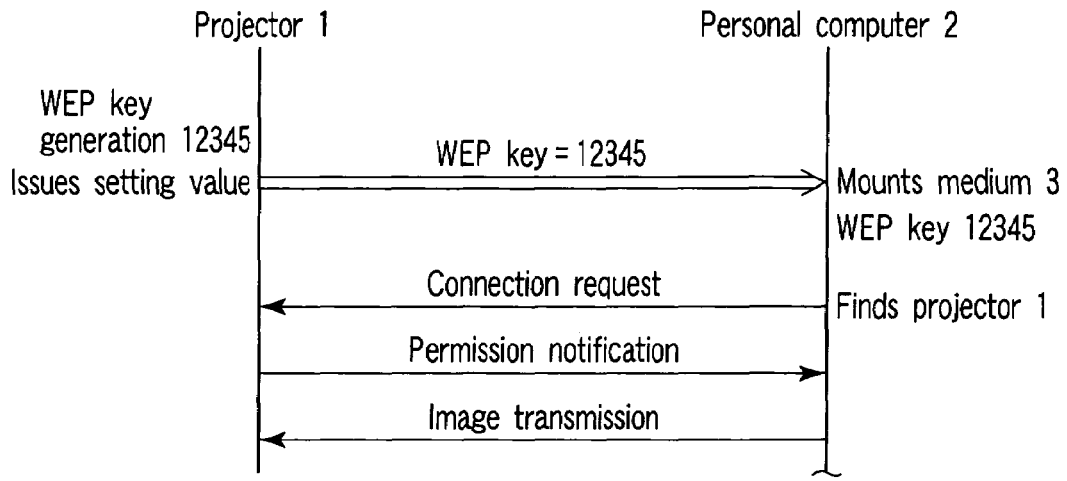
FIG. 9 is a view for explaining an application example of the communication control performed by the communication system regarding the embodiment.

Incidentally, although an example of the determination of the permission rejection of the connection request by checking whether or not the random numbers coincide by generating the random numbers on the side of the projector 1, it is possible to control in a similar way by using the WEP key and the SSID as substitute for the random numbers. That is to say, as shown in FIG. 9, when it is instructed to store the variety of pieces of information on the medium 3, the projector 1, for example, generates a WEP key newly then makes the PC 2 perform the environment setting using this WEP key to find the PC 2 itself. During the application of the WEP key (or SSID), the communication system can confirm that the opposite party is authorized one. In this case, though the environment setting should be newly performed on the side of the projector 1, as a result, exclusive control, for example, shown in FIG. 10 can be achieved.

Figure 10:
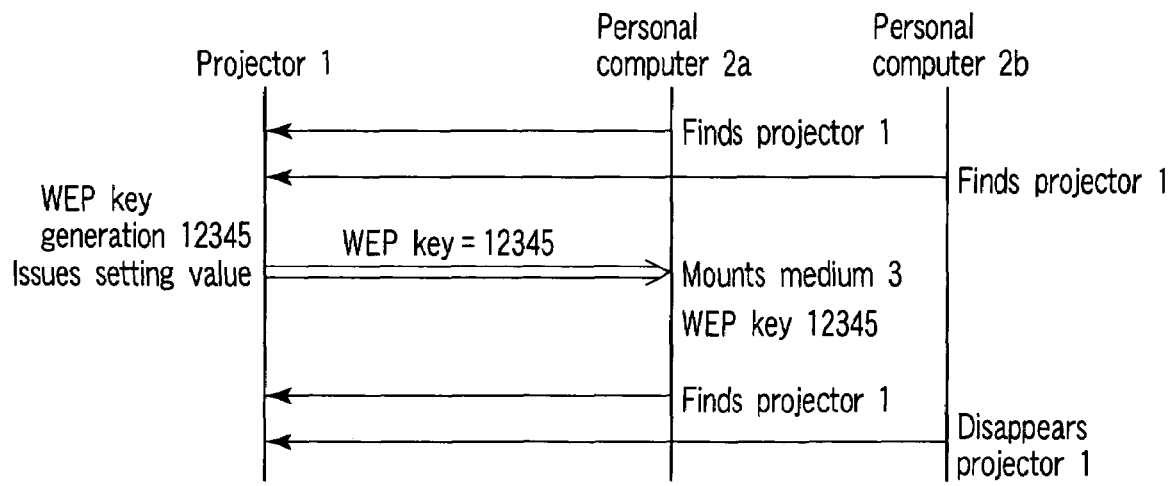
FIG. 10 is a view for explaining exclusive control achieved by a communication system (application example) regarding the embodiment.

Now, as shown in FIG. 10, two PCs of the PC 2*a* and the PC 2*b* are assumed to be in states possible to find the projector 1 by searching. Then, it is assumed that the user of the PC 2*a* proceeds the foregoing procedure using the medium 3 from this situation.

Accordingly, the projector 1 and the PC 2*a* update the environment setting on the basis of the new WEP key, but the PC 2*b* cannot follow this update, so that it becomes impossible to find the projector 1 in the first place.

Figure 11:
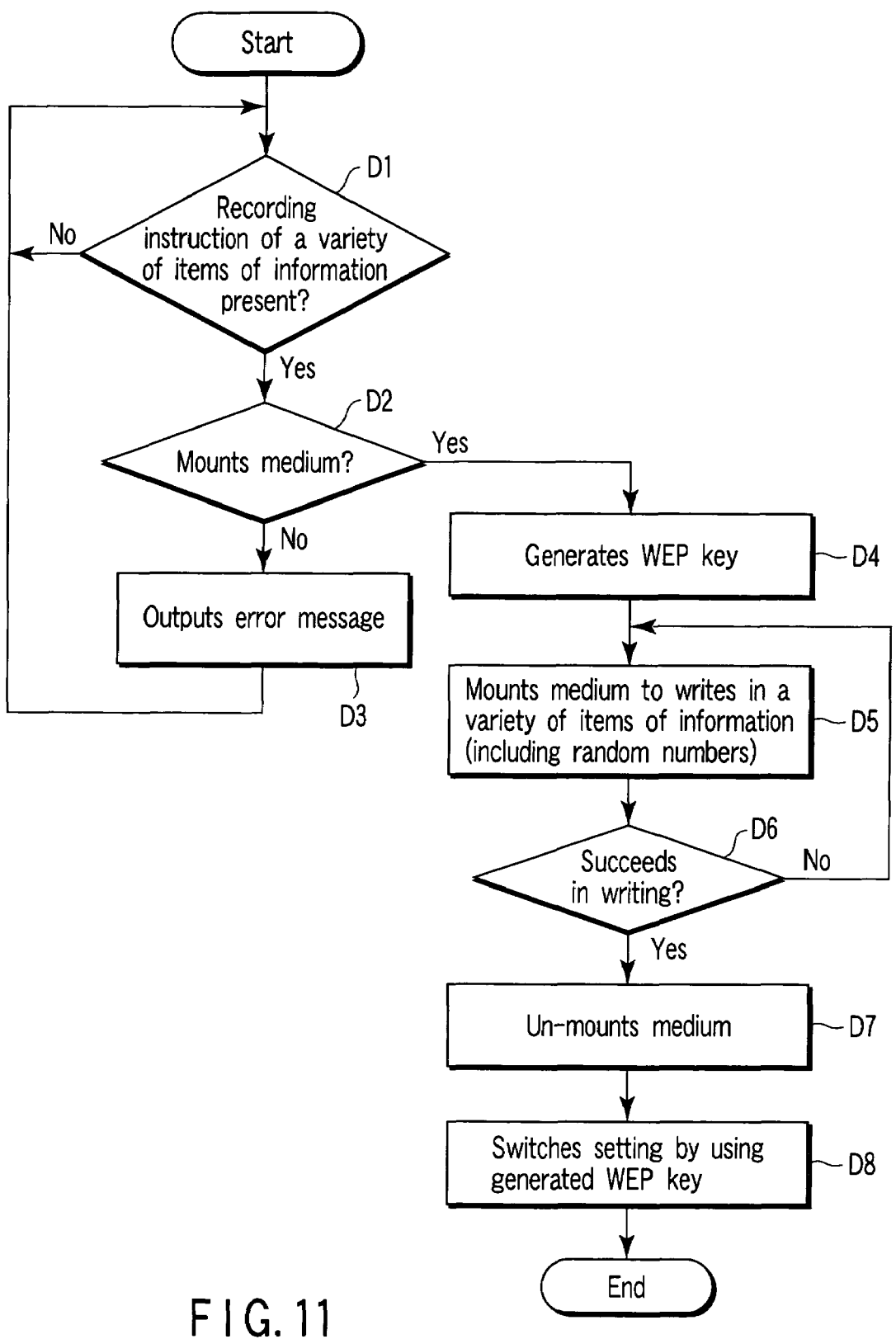
FIG. 11 is a flowchart showing an operation procedure when storing a variety of items of information including a WEP key onto a medium in a projector composing the communication system (application example) regarding the embodiment.

FIG. 11 is the flowchart showing the operation procedure when the variety of items of information including the WEP key in the projector 1 in an applied example.

When being informed the fact of depressing of the dedicated button of the remote controller 4 from the remote control unit 103 (YES in step D1), the main processing unit 101 inquires the presence or absence of the mounting of the medium 3 to the media driver unit 104 (step D2). If the medium 3 is not mounted (NO in step D2), the main processing unit 101 makes the user interface unit 102 display the error message to prompt the mounting of the medium 3 to the projector 1 (step D3).

If the medium 3 is mounted (YES in step D2), the main processing unit 101 has, for example, a WEP key generation unit corresponding to the random number generation unit 105, generate a new WEP key (step D4). Then, the main processing unit 101 instructs the mounting of the medium 3 and the writing of the variety of pieces of information including this generated WEP key into the medium 3 to the media driver 104 (step D5). When this writing is completed successfully (YES in step D6), the main processing unit 101 instructs the un-mounting of the medium 3 to the media driver unit 104 (step D7).

Furthermore, when storing the variety of kinds of information including the WEP key onto the medium 3, the main processing unit 101 executes again the environment setting for the wireless communication on the basis of the newly generated WEP key (step D8).

Like this, a wireless communication control method of the wireless communication system regarding the embodiment can modify to use the WEP key and the SSID as substitute for the random numbers.

Also, a part of the storage of the variety of items of information to perform the environment setting for the wireless communication on the side of the projector 1 and a part of the execution of the reading in of the variety of items of information from the medium 3 on the side of the PC 2 and the environment setting on the basis of the variety of items of information read from the medium 3, namely, a part of replications of so-called environment setting can be utilized by an existing package software, for example, such as a function to be referred to as "Windows (registered trademark) Connect Now" provided by Windows XP SP2 of Microsoft in the U.S.A. By utilizing such kinds of package software, it becomes enough for the side of the projector 1 only to add only a function of a part of generation and checking of the random numbers and for the side of the PC 2 only to add only, for example, a function of the transmission start of the connection request with addition of the random numbers and automatic transmission of the display data after receiving the permission notification.

Having described the wireless communication system composed of the projector 1 and the PC 2, as the example, it is possible for the wireless communication method of the present invention is not limited by this description, but rather can be applied to any electronic apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
a wireless communication unit;
a slot capable of detachably mounting a recording medium;
a random number generation unit configured to generate a random number;
a writing processing unit configured to write, when a predetermined operation is conducted, predetermined information which restricts wireless communication of the wireless communication unit to be made only to and from an authorized opposite party into the recording medium mounted on the slot, the predetermined information including the random number generated by the random number generation unit;
a determining unit configured to determine whether or not an opposite party transmitting a connection request to establish a wireless communication path is authorized based on the random number generated by the random number generation unit, when the connection request is received by the wireless communication unit; and
a control unit configured to permit the connection request when the determining unit determines that the opposite party is authorized, and to reject the connection request otherwise.

2. An electronic apparatus, comprising:
a wireless communication unit;
a slot capable of detachably mounting a recording medium;
a reading processing unit configured to read predetermined information to make wireless communication to and from an authorized opposite party from the recording medium mounted on the slot, the predetermined information including a random number;
a setting unit configured to perform environmental setting of wireless communication of the wireless communication unit using the predetermined information read out by the reading processing unit;
a transmitting unit configured to transmit a connection request to establish a wireless communication path via the wireless communication unit to the authorized opposite party by using the random number read out by the reading processing unit; and
a control unit configured to automatically start data transfer via the wireless communication unit when the connection request transmitted by the transmitting unit is permitted.

3. A wireless communication control method between a first and a second electronic apparatuses respectively having a wireless communication unit and slots capable of mounting recording media detachably, wherein
the first electronic apparatus comprises:
generating a random number;
writing, when a predetermined operation is conducted, predetermined information which restricts wireless communication of the wireless communication unit to be made only to and from the second electronic apparatus into a recording medium mounted on the slot, the predetermined information including the generated random number;
determining whether or not an opposite party transmitting a connection request to establish a wireless communication path is the second electronic apparatus on the basis of the generated random number when the connection request is received by the wireless communication unit; and
permitting the connection request when it is determined that the opposite party is the second electronic apparatus and rejecting the connection request otherwise, and the second electronic apparatus comprises:

reading out the predetermined information from the recording medium mounted on the slot;

performing environment setting of wireless communication of the wireless communication unit of the second electronic apparatus using the read out predetermined information;

transmitting the connection request to the first electronic apparatus via the wireless communication unit by using the read out random number; and automatically starting data transfer via the wireless communication unit when the transmitted connection request is permitted.

* * * * *